(12) United States Patent
Arvo

(10) Patent No.: US 7,872,649 B1
(45) Date of Patent: Jan. 18, 2011

(54) FILTERED SPECULAR REFLECTION OF LINEAR LIGHT SOURCES

(75) Inventor: Jim Arvo, Pasadena, CA (US)

(73) Assignee: Pixar, Emeryville, CA (US)

( * ) Notice: Subject to any disclaimer, the term of this patent is extended or adjusted under 35 U.S.C. 154(b) by 732 days.

(21) Appl. No.: 11/760,504

(22) Filed: Jun. 8, 2007

Related U.S. Application Data

(60) Provisional application No. 60/812,306, filed on Jun. 9, 2006.

(51) Int. Cl.
*G06T 15/00* (2006.01)

(52) U.S. Cl. ........................ 345/426; 356/133; 359/622; 703/2

(58) Field of Classification Search ................ 345/426, 345/473, 474, 475; 356/133; 359/622; 703/2
See application file for complete search history.

(56) References Cited

U.S. PATENT DOCUMENTS

| | | | |
|---|---|---|---|
| 6,567,083 B1 * | 5/2003 | Baum et al. ................ | 345/426 |
| 6,587,276 B2 * | 7/2003 | Daniell ........................ | 359/622 |
| 7,286,214 B2 * | 10/2007 | Reinersman et al. ........ | 356/214 |
| 7,460,985 B2 * | 12/2008 | Benitez et al. ................. | 703/2 |

OTHER PUBLICATIONS

Krivanek et al., Radiance Caching for Efficient Global illumination Computation, IEEE transaction on Visualization and Computer Graphics, vol. 11, No. 5, Sep. 2005, pp. 550-561.*

* cited by examiner

*Primary Examiner*—Phu Nguyen
(74) *Attorney, Agent, or Firm*—Townsend and Townsend and Crew LLP

(57) ABSTRACT

An image rendering method for a computer system includes identifying a point in space to be illuminated from at least one line light for the point, and determining an illumination direction of the line light. The method further includes generating a plane passing through the point, and projecting the line light onto the plane. The method further includes determining a brightness contribution for the point responsive to a function characterizing the brightness contribution.

47 Claims, 3 Drawing Sheets

FILTERED SPECULAR REFLECTION OF LINEAR LIGHT SOURCES

CROSS-REFERENCES TO RELATED APPLICATIONS

This application claims priority to U.S. Provisional Patent Application No. 60/812,306, filed Jun. 9, 2006, titled "SPECULAR FAR-FIELD IRRADIANCE APPROXIMATION", of Jim Arvo and is incorporated by reference herein in its entirety for all purposes.

BACKGROUND OF THE INVENTION

The present invention relates to computer animation. More particularly, the present invention relates to spreading the brightness of a set of light sources at a surface to generate a specular reflection and a fuzzy reflection that is adjacent to the specular reflection.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer-aided animation (CA) industry was Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006) and others. In addition to creating animated features, Pixar developed computing platforms specially designed for CA, and CA software now known as RenderMan®. RenderMan® was particularly well received in the animation industry and recognized with two Academy Awards®. The RenderMan® software included a "rendering engine" that "rendered" or converted geometric and/or mathematical descriptions of objects into a two dimensional image. The named inventor of the present invention co-developed the original RenderMan® software.

Reducing rendering time is very important for computer animation. The rendering process can be a time consuming operation that may take hours, if not days, when rendering a scene with many objects. As an example, if a scene included ten thousand light sources, the rendering engine might have made ten thousand squared calculations to render a pixel in a scene. Accordingly, the time to render such a scene would be unacceptably long. Multiplying this rendering time by the number of frames (e.g. 130,000) in a typical feature-length animated feature of images results in a rendering time that is impractical.

Various rendering techniques have been used to accelerate rendering of images for matte (or non-specular) surface wherein the light sources were modeled as being infinitely distant. Such techniques include image mapping techniques, wherein an image map is generated and surrounds a point at an origin for which an image is rendered. Such techniques fail to take into account far-field and mid-field lighting effects that are not necessarily associated with an infinite light source. Moreover, such techniques fail to provide for specular reflections and the effects associated therewith, such as the glow (or fuzziness) that surrounds a central position of a specular reflection.

Therefore, new methods and apparatus are needed for approximating light sources and/or objects illuminated by the lights such that these methods and apparatus may be used to substantially realistically render the objects in animated scenes.

BRIEF SUMMARY OF THE CLAIMED EMBODIMENTS

The present invention provides a computer animation method and computer animation system. More particularly, the present invention provides a computer animation method and computer animation system for spreading the brightness of a set of light sources at a surface to generate a fuzzy-specular reflection.

According to one embodiment of the present invention, an image rendering method for a computer system includes identifying a point in space to be illuminated from at least one line light for the point, and determining an illumination direction of the line light. The method further includes generating a plane passing through the point, and projecting the line light onto the plane. The method further includes determining a brightness contribution for the point responsive to a function characterizing the brightness contribution.

According to a specific embodiment of the invention, the step of projecting includes projecting the line light onto the plane based on to the illumination direction. The function is pre-calculated. The illumination direction is based on a scattering function for the point. The orientation of the plane is based on the illumination direction.

According to another specific embodiment of the invention, the function is a lookup table. The lookup table may be parameterized for identifying the line light and the brightness contributions and is associated with at least one filter function that is configured to spread the brightness of a reflection at the point to generate a fuzzy-specular reflection. The method may further include retrieving the lookup table from memory.

According to another specific embodiment of the invention, the step of determining the illumination direction includes determining the reflection of a ray from the point to an observation point based on an observation angle of a viewer relative to the point. The method may further include generating a cone from the point toward the line light, wherein a primary axis of the cone is the illumination direction and the point is the apex of the cone. The plane is perpendicular to the axis of the cone. The method may further include clipping the projection of the line light against a circle as viewed through the cone from the point.

According to another specific embodiment of the invention, the function is a lookup table, and the step of determining the brightness contribution includes determining the brightness contribution of the clipped two-dimensional projection via a parameterized look up in the lookup table.

According to another specific embodiment of the invention, the at least one line light is a member of a plurality of line lights, and the method steps are repeated for each line light of the plurality. The method may further include determining a subset of the plurality of line lights that intersect the cone via a hierarchy of bounding spheres technique.

According to another specific embodiment of the invention, the method further includes storing an image for a fuzzy-specular reflection from the line light on the point responsive to the brightness contribution. The method may further include repeating the method steps for a plurality of points on a surface; and storing an image for a fuzzy-specular reflection from the line light on the point responsive to the brightness contribution.

According to another embodiment of the invention, a computer method for generating a computer lookup table, which includes brightness contributions to a reflection of a set of line lights from a surface includes determining a pair of coordinates to uniquely specify the line light in the table including: i) determining a first coordinate that is a distance from a center of a unit circle surrounding the line light to a chord of the circle on which the line light lies, and ii) determining a second coordinate that is a fraction of the chord covered by the line light. The method further includes numerically integrating the brightness contribution along the line light with a filter function, which is configured to spread the light from the line light for generating a fuzzy-specular reflection of the line light on the surface. The method further includes storing in the table the brightness contribution of the line light at a location in the table associated with the pair of coordinates for line light; and storing the table on a computer readable medium. The filter function may be a symmetric function, such as a Gaussian or a polynomial. The numerical integration step may include applying Simpson's rule to the line light.

A better understanding of the nature and advantages of the present invention may be gained with reference to the following detailed description and the accompanying drawings.

DETAILED DESCRIPTION OF THE INVENTION

Figure 1:
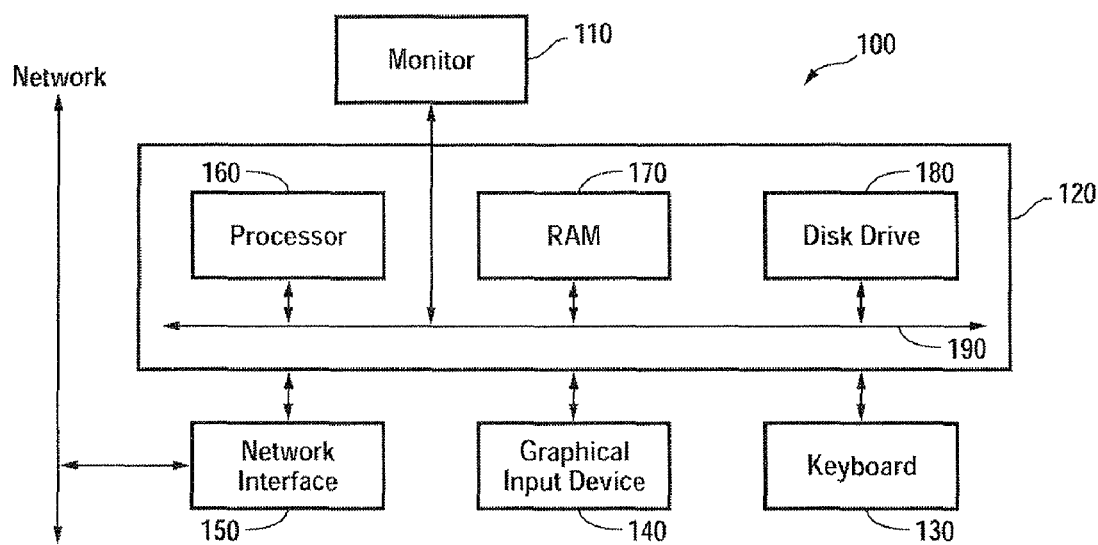
FIG. 1 is a block diagram of a typical computer system according to an embodiment of the present invention.

FIG. 1 is a block diagram of a typical computer system 100 according to an embodiment of the present invention.

In the present embodiment, computer system 100 typically includes a monitor 110, computer 120, a keyboard 130, a user input device 140, computer interfaces 150, and the like.

In the present embodiment, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like.

Embodiments of computer interface 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120, may be a software program, such as soft DSL, or the like.

In various embodiments, computer 120 typically includes familiar computer components such as a processor 160, and memory storage devices, such as a random access memory (RAM) 170, disk drives 180, and system bus 190 interconnecting the above components.

In one embodiment, computer 120 includes one or more Xeon microprocessors from Intel. Further, in the present embodiment, computer 120 typically includes a UNIX-based operating system.

RAM 170 and disk drive 180 are examples of tangible media configured to store data such as image files, models including geometrical descriptions of objects, ordered geometric descriptions of objects, procedural descriptions of models, scene descriptor files, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Core™ microprocessors; Turion™ 64, Opteron™ or Athlon64™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board (e.g. graphics processor unit).

Figure 2:
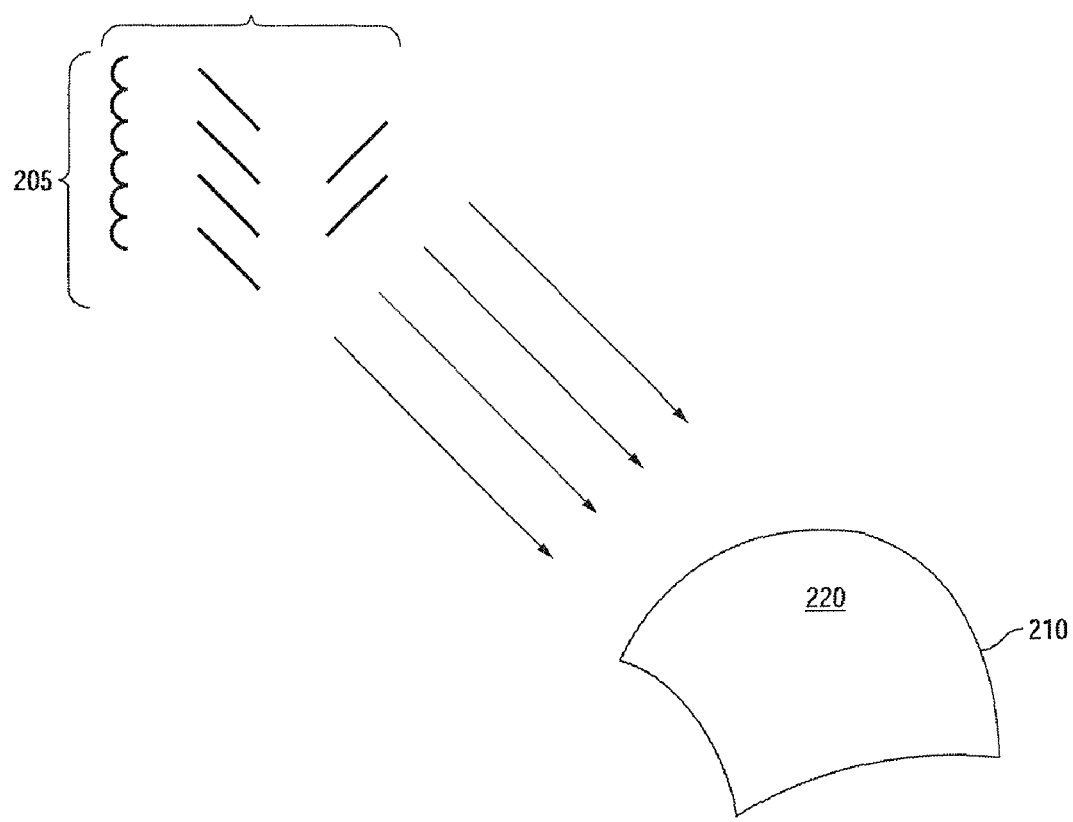
FIG. 2 illustrates a simplified diagram of a process according to one embodiment of the present invention.

FIG. 2 illustrates a simplified diagram of a process according to one embodiment of the present invention.

More specifically, FIG. 2 provides a high-level illustration of one embodiment of a scene descriptor where a plurality of line lights 205 is configured to illuminate an object 210 having a surface 220, which may be a partially specular surface (described in further detail below). The plurality of line lights might include any number of line lights, e.g., two, tens, hundreds, or even thousands of line lights. In various embodiments, a line light includes a light source that is generally shaped like a line. As can be seen in FIG. 2, the plurality of line lights might include straight line lights and/or curved line lights. A curved line light might be estimated as a set of straight line lights. In the computer systems, the line lights may represent a florescent light, a neon light or the like that is configured to illuminate the surface of the object. The scene descriptor in this example specifies the surface of object 210 as a partially specular surface. That is, a light reflected in the surface may have a "fuzzy-specular reflection." A fuzzy-specular reflection is a reflection that softens from the center of the reflection outward.

Figure 3:
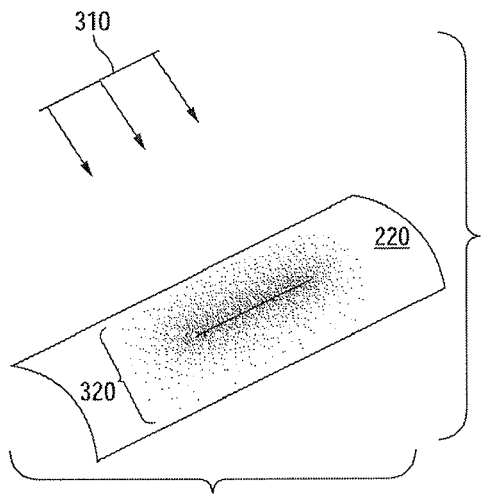
FIG. 3 illustrates a simplified diagram of a fuzzy-specular reflection according to another embodiment of the present invention.

FIG. 3 illustrates a simplified diagram of a fuzzy-specular reflection according to one embodiment of the present invention.

The diagram of FIG. 3 includes a single line light 310 that is configured to illuminate surface 220. Surface 220 may be a computer generated surface and may have a computer generated fuzzy-specular reflection 320 of the line light according to one embodiment of the present invention. The fuzzy-specular reflection includes a relatively sharp central portion that becomes softer away from the central portion. As shown, the fuzzy-specular reflection softens along the side portions of the relatively sharp portion of the reflection. The fuzzy-specular reflection might also soften from the ends of the relatively sharp portion of the reflection (not shown in FIG. 3). That is, the computer, via a program running thereon, may be configured to spread the light from the line light in one and/or two dimensions to generate the fuzzy specular reflection. While FIG. 3 shows a single line light and fuzzy-specular reflection thereof from the surface, it should be understood that the embodiment of FIG. 3 is exemplary and that the computer may be configured to generate fuzzy-specular reflections for a plurality of line lights, such as those line lights shown in FIG. 2.

According to one embodiment of the present invention, prior to rendering an image of a fuzzy-spectral reflection for a set of line lights from a surface, at least one parameterized table (or "table") is generated by the computer where the table includes characterization information for the line lights. The table may be used as a lookup table by the computer to access the characterization information for image rendering. The characterization information may include brightness contributions for the line lights, colors contributions for the line lights, and/or other information. The term "contributions" as referred to herein when referring to the characteristic information for the line lights may include one or more contributions, such as brightness, color, etc. The vertical axis of the table may be associated with one coordinate of a pair of coordinates (or "pair") for the line lights, and the horizontal axis of the table may be associated with another coordinate for the line lights. Each line light is associated with a unique pair of coordinates from the table. Generating a table that includes the characterization information for the line lights, provides that the characterization information for the line lights may be calculated once before rendering one or more fuzzy-specular reflections of the line lights from the surface. That is, the characterization information does not need to be recalculated each time a point on the surface is rendered, and does not need to be recalculated if multiple fuzzy-specular reflections of the line lights are rendered.

Figure 4:
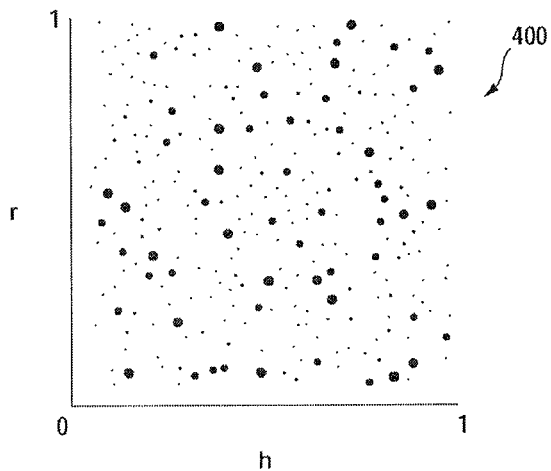
FIG. 4 illustrates a simplified diagram of a process according to another embodiment of the present invention.

FIG. 4 is simplified schematic of an example table 400 according to one embodiment of the present invention. As mentioned briefly above, each pair of coordinates of the table represents configuration information of a single line light. More specifically, each pair represents a unique line light within a unit circle where "r" is the distance from the center of the circle to a chord containing the line light, and "h" is the fraction of the chord (having length "D") covered by the line light (having length "d") where h=d/D. That is, the line light meets the circle at one end of the line light, and the line light extends the fraction h to the other side of the circle. According to one embodiment, table 400 is a unit table with sides that range from zero to one, and both r and h range from zero to one. The coordinates r and h may be evenly-spaced numbers from 0 to 1.

The characterization information that is included in the table may be determined via a variety of numerical calculation techniques. According to one embodiment, a filter function is applied to the characterization information. The filter function may be a Gaussian, a polynomial, or other symmetric function. The filter function provides that light from each line light is reflected from the surface as a fuzzy-specular reflection. The filter function may be numerically integrated over the length of a line light as the characterization information is calculated. That is, the filter function becomes inherently included in the characterization information that is included in the table. The numerical integration may be performed using Simpson's rule or other technique that are known to those of skill in the art. Subsequent to calculating the characterization information, this information is stored in appropriate (r,h) positions in the table.

Figure 5A:
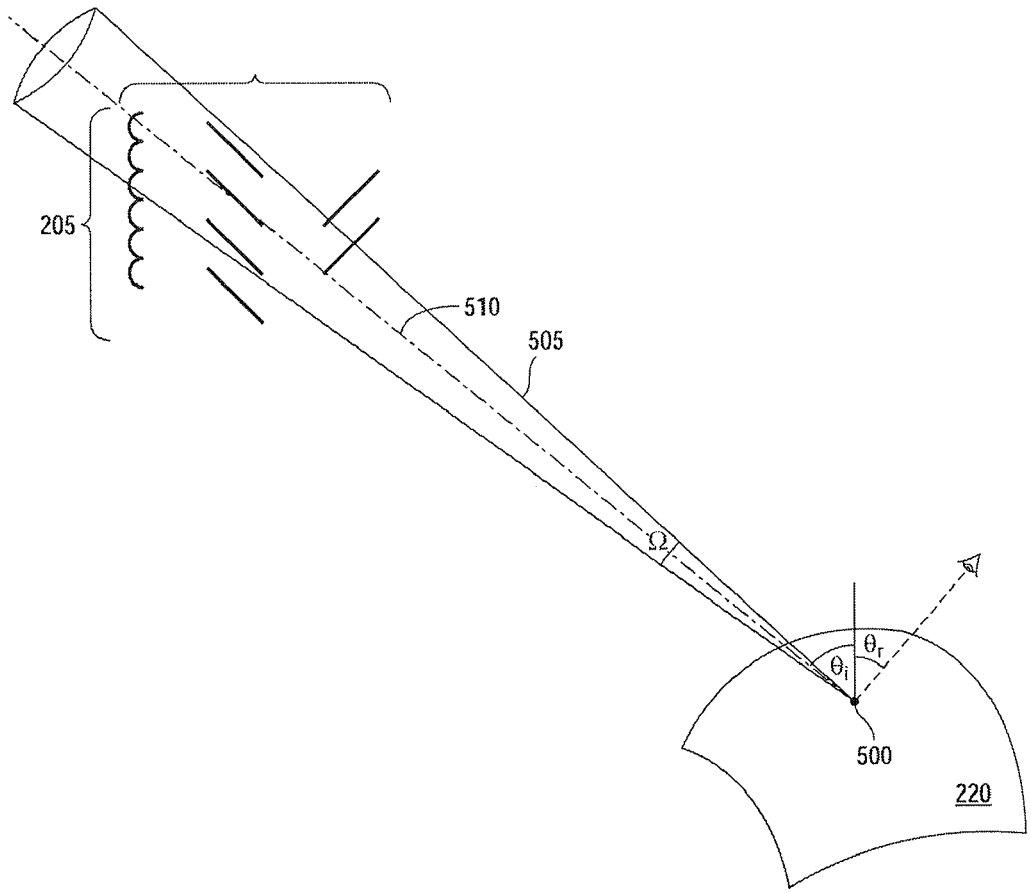
FIG. 5A illustrates a simplified diagram of a process according to another embodiment of the present invention.

FIG. 5A illustrates a simplified diagram of a process according to another embodiment of the present invention.

Figure 5B:
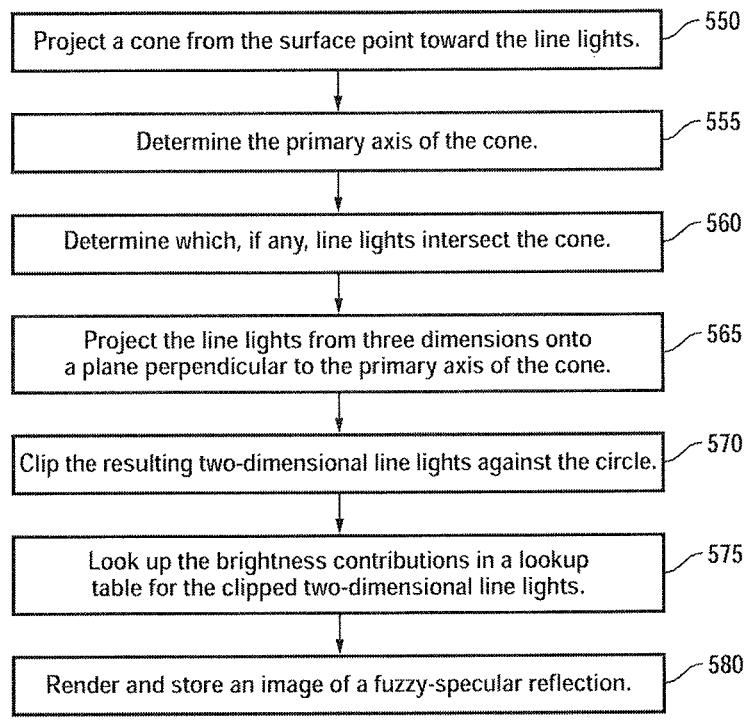
FIG. 5B is a high-level flow diagram that illustrates a simplified process according to another embodiment of the present invention.

FIG. 5B is a high-level flow diagram that illustrates a simplified process according to another embodiment of the present invention;

For convenience, FIGS. 5A and 5B are referred to together below. The diagram of FIG. 5A includes the surface 220 from which the plurality of line lights 205 is configured to reflect, i.e., for which an image of the reflection is to be rendered by the computer. To render an image of the line lights at a point 500 on the surface, according to one embodiment of the present invention, a cone 505 is generated that encloses zero or more of the line lights (step 550). The apex of the cone lies at a point 225 on the surface of the object. The solid angle Ω of the cone may be adjusted by the computer to adjust for the reflection properties of the surface. The solid angle of the cone may also be user specified. According to one embodiment, a relatively large solid angle provides that the fuzziness of the fuzzy-specular reflection is relatively enhanced, whereas a relatively smaller solid angle provides that the fuzziness of the fuzzy-specular reflection is relatively less. The primary axis 510 of the cone is determined by the viewing angle of the "viewer" (step 555). The angle θi (primary angle of incidence) of the primary axis 510 is equal and opposite to the angle θr (angle of reflection) for a ray traveling to the viewer. The angle of reflection is the viewing angle of the viewer.

To determine which of the line lights intersect the cone, the computer applies a hierarchy of bounding sphere method (step 560). The hierarchy of bounding spheres method includes placing a tight fitting sphere around each line light. Subsequently, sets of nearest neighbor line lights are placed in larger and larger tightly fitting spheres. This process is iterated until all of the line lights are in a largest bounding sphere. The result is a "tree" structure of bounding spheres.

Figure 6:
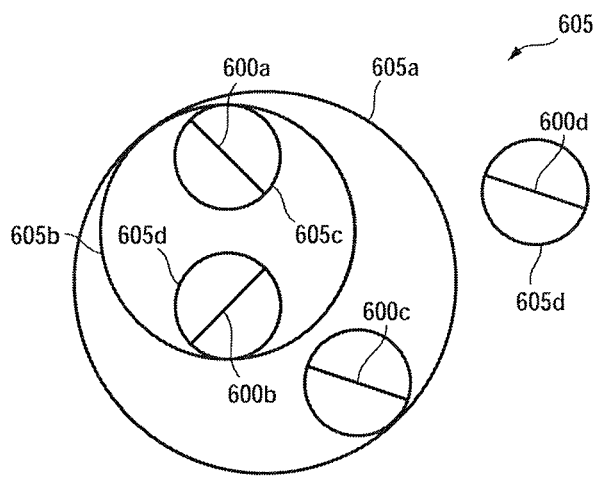
FIG. 6 illustrates a simplified diagram of a tree of bounding sphere according to one embodiment of the present invention.

FIG. 6 is an example diagram of a set of line lights 600 that lie in a tree of bounding spheres 605.

The line light segments and tree in FIG. 6 are shown for illustrative purposes. A largest bounding sphere 605a encloses all of the line lights. One child bounding sphere 605b, which is a child of bounding sphere 605a, encloses two of the line lights 600a and 600b. Two child-bounding spheres 605c and 605d, which are children of bounding spheres 600a and 600b, enclose line lights 600a and 600b respectively. Another child bounding sphere 600c, which is a child of bounding sphere 605a, encloses line light 605c. Another line light 600d may be bound in a sphere 605d that is not a child of any other bounding spheres. While other bounding hierarchical shapes may be used to generate a tree, a sphere is a relatively simple shape for which an intersection of line lights with a cone may be determined.

To determine which of the line lights (zero or more line lights) intersect a given cone, the largest bounding sphere that fits with in the given cone is tested to determine these zero or more line lights. If there are no line lights in the sphere, then there are no line lights that intersect the cone. If there are one or more line lights in the sphere, then the spheres associated with children of the largest bounding sphere are tested to determine whether there are line lights in these children spheres. This step of determining whether zero or more line lights are in children spheres of larger bounding spheres is repeated until all of the "branches" of the tree have been tested for enclosed line lights.

After the line lights that intersect the cone are determined, the line lights lying in three dimensions are projected onto a plane perpendicular to primary axis 510 of the cone (step 565). The resulting two dimensional line lights are clipped against a circle of the cone (step 570). The circle of the cone is a circle that would be viewed from the apex of the cone looking down the primary axis.

Figure 7:
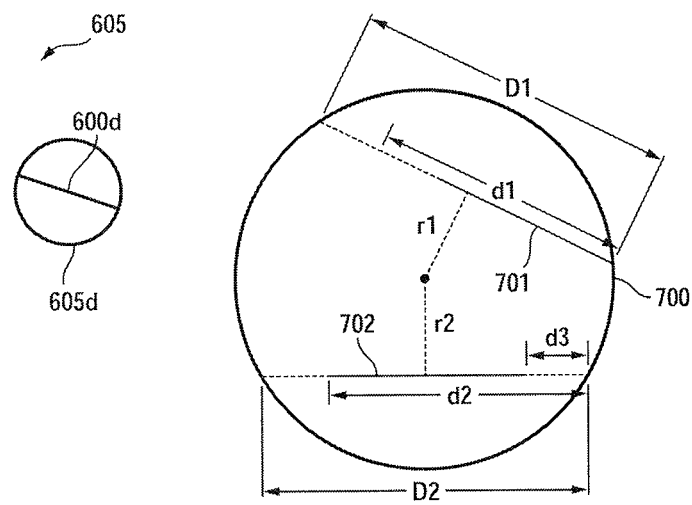
FIG. 7 a simplified diagram of a process according to another embodiment of the present invention.

FIG. 7 is an example diagram of a circle 700 that has two clipped line lights 701 and 702 projected thereon.

The circle 700 would be seen by an observer looking down a cone from the apex. Subsequent to determining the clipped line lights that intersect the circle, the contributions to the reflection at the point from the clipped line lights are summed. Determining the contribution (also sometime referred to herein as characterization information) to the reflection for a given clipped line light, such as clipped line light 701, includes looking up the contribution in the lookup table (step 775). Determining the contribution includes determining the radial distance r1 from the center of the cone to the cord D1 containing the given line light. The fraction h1 of the chord covered by the line light having length d1 is h1=d1/D1. The contribution for (r1,h1) is then looked up in the table.

If the line light does not contact the boundary of the circle (i.e., the line light is entirely in the circle) then two lookups in the table are performed to determine the contribution from the line light. For example, for clipped line light 702 a first lookup for (r2, h2) is performed where h2=d2/D2 and d2 is the distance along the chord D2 from the circle to one end point of the clipped line light. A lookup for (r2, h3) is also performed where h3=d3/D2 and d2 is the distance along the chord D2 from the same point on the circle to the other end of the clipped line light. The difference between these two contributions for d2 and d3 is then calculated where the difference is the contribution from the clipped line light 702. Thus, the clipped line light is treated as though it runs to the edge of the circle and a contribution from that clipped line light is subtracted to determine the actual contribution.

According to one embodiment of the present invention, looking up the brightness contributions for (r,h) pairs in the table includes the computer performing a bilinear interpolation to determine the contributions for the line light. That is, because r and h are real values, it is unlikely that (r,h) will be in the table explicitly. However, the computer may be configured find four nearby points that bracket the point (r,h). The computer is then configured to determine the value associated with the given (r,h) pair by interpolating the four known values associated with the four nearby points. The lookups and interpolations are generally much faster than performing the numerical integration for each line light for image rendering.

The foregoing described steps for determining the brightness contribution for a given point on the surface is repeated by the computer for each point on the surface. That is, for each point on the surface, a similar cone is generated by the computer. For each point, the line lights that are in the cone are determined and the reflection contributions for these line lights are determined. If the surface is a relatively flat surface the cones may point in substantially the same direction. Alternatively, if the surface is curved, the cones might point in disparate directions to take into account the surface curvature. The number of points on the surface for which an image of a reflection is rendered may be chosen by the computer user or the computer software operating on the computer. The number of points may include tens, hundreds, or thousands of points. Via the determination of the reflections of the line lights for each of the points of the surface, an image may be rendered of the reflection of the plurality of line lights from the surface. The rendered image may be stored in the computer for use in an animated feature (step 580). The surface might be rotated or moved relative to the line lights and a series of rendered images of the reflected line lights may be generated. These rendered images might be stored in the computer to generate an animated sequence of images for an animated feature.

Further embodiments can be envisioned by one of ordinary skill in the art after reading this disclosure. In other embodiments, combinations or sub-combinations of the above disclosed invention can be advantageously made. For example, while the foregoing exemplary embodiments have been described as being applicable to line lights, nearly any light shape may be used in the various embodiments of the invention. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computerized image rendering method for a computer system comprises:

identifying by the computer system a point in space to be illuminated from at least one line light for the point;

determining by the computer system an illumination direction of the line light;

generating by the computer system a plane passing through the point;

projecting by the computer system the line light onto the plane; and determining by the computer system a brightness contribution for the point responsive to a function characterizing the brightness contribution.

2. The method of claim 1, wherein the step of projecting by the computer system includes projecting by the computer system the line light onto the plane based on the illumination direction.

3. The method of claim 2, wherein the function is pre-calculated.

4. The method of claim 2, wherein the illumination direction is based on a scattering function for the point.

5. The method of claim 2, wherein the orientation of the plane is based on the illumination direction.

6. The method of claim 2, wherein the function is a lookup table.

7. The method of clam 6, wherein the lookup table is parameterized for identifying the line light and the brightness contributions and is associated with at least one filter function that is configured to spread the brightness of a reflection at the point to generate a fuzzy-specular reflection.

8. The method of claim 7 further comprises retrieving by the computer system the lookup table from computer memory.

9. The method of claim 2, wherein the step of determining by the computer system the illumination direction includes determining by the computer system the reflection of a ray from the point to an observation point based on an observation angle of a viewer relative to the point.

10. The method of claim 9 further comprises generating by the computer system a cone from the point toward the line light, wherein a primary axis of the cone is the illumination direction and the point is the apex of the cone.

11. The method of claim 10, wherein the plane is perpendicular to the axis of the cone.

12. The method of claim 11 further comprises clipping by the computer system the projection of the line light against a circle as viewed through the cone from the point.

13. The method of claim 12, wherein the function is a lookup table, and the step of determining by the computer system the brightness contribution includes determining by the computer system the brightness contribution of the clipped two-dimensional projection via a parameterized look up in the lookup table.

14. The method of claim 13, wherein the at least one line light is a member of a plurality of line lights, and the method steps are repeated for each line light of the plurality.

15. The method of claim 14 further comprises determining by the computer system a subset of the plurality of line lights that intersect the cone via a hierarchy of bounding spheres technique.

16. The method of claim 2 further comprises storing by the computer system an image for a fuzzy-specular reflection from the line light on the point responsive to the brightness contribution.

17. The method of claim 2 further comprises:

repeating by the computer system the method steps for a plurality of points on a surface; and storing in a computer memory by the computer system an image for a fuzzy-specular reflection from the line light on the point responsive to the brightness contribution.

18. A computer non-transitory medium storing a computer program executable by a computer system for image rendering wherein the computer program comprises:

code for identifying a point in space to be illuminated from at least one line light for the point;

code for determining an illumination direction of the line light;

code for generating a plane passing through the point;

code for projecting the line light onto the plane; and code for determining a brightness contribution for the point responsive to a function characterizing the brightness contribution.

19. The non-transitory medium of claim 18, wherein the code for projecting includes code for projecting the line light onto the plane based on to the illumination direction.

20. The non-transitory medium of claim 19, wherein the function is pre-calculated.

21. The non-transitory medium of claim 19, wherein the illumination direction is based on a scattering function for the point.

22. The non-transitory medium of claim 19, wherein the orientation of the plane is based on the illumination direction.

23. The non-transitory medium of claim 19, wherein the function is a lookup table.

24. The non-transitory medium of clam 23, wherein the lookup table is parameterized for identifying the line light and the brightness contributions and is associated with at least one filter function that is configured to spread the brightness of a reflection at the point to generate a fuzzy-specular reflection.

25. The non-transitory medium of claim 24 further comprises code for retrieving the lookup table from memory.

26. The non-transitory medium of claim 19, wherein the code for determining the illumination direction includes code for determining the reflection of a ray from the point to an observation point based on an observation angle of a viewer relative to the point.

27. The non-transitory medium of claim 26 further comprises code for generating a cone from the point toward the line light, wherein a primary axis of the cone is the illumination direction and the point is the apex of the cone.

28. The non-transitory medium of claim 27, wherein the plane is perpendicular to the axis of the cone.

29. The non-transitory medium of claim 27 further comprises code for clipping the projection of the line light against a circle as viewed through the cone from the point.

30. The non-transitory medium of claim 29, wherein the function is a lookup table, and the code for of determining the brightness contribution includes code for determining the brightness contribution of the clipped two-dimensional projection via a parameterized look up in the lookup table.

31. A computer system for image rendering comprises:

a processor for executing computer code;

a memory for storing the computer code;

a bus system for transferring the computer code from the memory to the processor for processing, wherein the computer code includes:

code for identifying a point in space to be illuminated from at least one line light for the point;

code for determining an illumination direction of the line light;

code for generating a plane passing through the point;

code for projecting the line light onto the plane; and code for determining a brightness contribution for the point responsive to a function characterizing the brightness contribution.

32. The computer system of claim 31, wherein the code for projecting includes code for projecting the line light onto the plane based on to the illumination direction.

33. The computer system of claim 32, wherein the function is pre-calculated.

34. The computer system of claim 32, wherein the illumination direction is based on a scattering function for the point.

35. The computer system of claim 32, wherein the orientation of the plane is based on the illumination direction.

36. The computer system of claim 32, wherein the function is a lookup table.

37. The computer system of clam 36, wherein the lookup table is parameterized for identifying the line light and the brightness contributions and is associated with at least one filter function that is configured to spread the brightness of a reflection at the point to generate a fuzzy-specular reflection.

38. The computer system of claim 37, wherein the code further comprises code for retrieving the lookup table from memory.

39. The computer system of claim 38, wherein the code further comprises code for determining the illumination direction includes code for determining the reflection of a ray from the point to an observation point based on an observation angle of a viewer relative to the point.

40. The computer system of claim 39, wherein the code further comprises code for generating a cone from the point toward the line light, wherein a primary axis of the cone is the illumination direction and the point is the apex of the cone.

41. The computer system of claim 40, wherein the plane is perpendicular to the axis of the cone.

42. The computer system of claim 41, wherein the code further comprises code for clipping the projection of the line light against a circle as viewed through the cone from the point.

43. The computer system of claim 41, wherein the function is a lookup table, and the code for of determining the brightness contribution includes code for determining the brightness contribution of the clipped two-dimensional projection via a parameterized look up in the lookup table.

44. A computer method of generating a computer lookup table, which includes brightness contributions to a reflection of a set of line lights from a surface, the method comprising for each line light:
   determining by a computer a pair of coordinates to uniquely specify the line light in the table including:
   determining by the computer a first coordinate that is a distance from a center of a unit circle surrounding the line light to a chord of the circle on which the line light lies, and
   determining by the computer a second coordinate that is a fraction of the chord covered by the line light;
   numerically integrating by the computer the brightness contribution along the line light with a filter function, which is configured to spread the light from the line light for generating a fuzzy-specular reflection of the line light on the surface;
   storing by the computer in a computer memory in the table the brightness contribution of the line light at a location in the table associated with the pair of coordinates for line light; and
   storing the table on a computer readable medium.

45. The computer method of claim 44, wherein the filter function is a symmetric function.

46. The computer method of claim 45, wherein the filter function is a Gaussian or a polynomial.

47. The computer method of claim 46, wherein the numerical integration step includes applying by the computer Simpson's rule to the line light.

* * * * *